US011210083B1

(12) United States Patent
Abadi et al.

(10) Patent No.: US 11,210,083 B1
(45) Date of Patent: Dec. 28, 2021

(54) SYSTEM AND METHOD FOR SAFE UPDATING OF OPEN SOURCE LIBRARIES

(71) Applicant: WHITESOURCE LTD., Givatayim (IL)

(72) Inventors: Aharon Abadi, Givatayim (IL); Doron Cohen, Givatayim (IL); Ram Elron, Givatayim (IL); Anna Rozin Lellouche, Givatayim (IL); Rami Sass, Givatayim (IL); Asaf Savich, Givatayim (IL)

(73) Assignee: WHITESOURCE LTD., Givatayim (IL)

( * ) Notice: Subject to any disclaimer, the term of this patent is extended or adjusted under 35 U.S.C. 154(b) by 0 days.

(21) Appl. No.: 17/071,663

(22) Filed: Oct. 15, 2020

(51) Int. Cl.
 *G06F 8/65* (2018.01)
 *G06F 8/71* (2018.01)

(52) U.S. Cl.
 CPC . *G06F 8/65* (2013.01); *G06F 8/71* (2013.01)

(58) Field of Classification Search
 CPC .................................... G06F 8/65; G06F 8/71
 See application file for complete search history.

(56) References Cited

U.S. PATENT DOCUMENTS

| 7,870,547 | B2 * | 1/2011 | Schuft | G06F 8/65 717/168 |
| 8,245,216 | B2 * | 8/2012 | Felts | G06F 8/65 717/169 |
| 8,490,054 | B2 * | 7/2013 | Dattathreya | G06F 8/71 717/121 |
| 10,430,204 | B2 * | 10/2019 | Reeves | G06F 8/65 |
| 11,132,193 | B1 * | 9/2021 | Rosenbaum | G06F 8/73 |
| 2004/0031027 | A1 * | 2/2004 | Hiltgen | G06F 8/65 717/170 |

(Continued)

FOREIGN PATENT DOCUMENTS

| CN | 108334333 A | * | 7/2018 |
| CN | 108376082 A | * | 8/2018 |

OTHER PUBLICATIONS

Teyton et al., "A Study of Library Migration in Java Software", Jun. 2013, Univ. Bordeaux (Year: 2013).*

(Continued)

*Primary Examiner* — Wei Y Zhen
*Assistant Examiner* — Junchun Wu
(74) *Attorney, Agent, or Firm* — The Roy Gross Law Firm, LLC; Roy Gross (57) ABSTRACT

A method, computerized apparatus and computer program product, the method comprising: obtaining code; determining a collection of open source libraries used by the code; for each open source library: determining whether an updated version comprising an update area exists for the library; and subject to the existence of an updated version: subject to the updated area not being reachable from the user code, updating the open source library to the updated version; subject to the updated area being reachable only from a non-updated area of the updated version wherein the non-updated area is reachable from the user code, updating the open source library to the updated version; and subject to the updated area being reachable directly from a part of the user code, notifying a user about the updated version of the open source library and the part of the computer code.

13 Claims, 9 Drawing Sheets

(56) References Cited

U.S. PATENT DOCUMENTS

| | | | | |
|---|---|---|---|---|
| 2004/0215755 | A1* | 10/2004 | O'Neill | G06F 8/654 |
| | | | | 709/223 |
| 2006/0236317 | A1* | 10/2006 | Wetherly | G06F 8/65 |
| | | | | 717/168 |
| 2012/0297363 | A1* | 11/2012 | Perisic | G06F 8/71 |
| | | | | 717/122 |
| 2014/0033191 | A1* | 1/2014 | Ward | G06F 9/44536 |
| | | | | 717/170 |
| 2016/0139916 | A1* | 5/2016 | Pillay | G06F 8/70 |
| | | | | 717/122 |
| 2016/0323301 | A1* | 11/2016 | Boss | G06F 21/554 |
| 2017/0220334 | A1* | 8/2017 | Hart | H04L 67/34 |
| 2017/0372247 | A1* | 12/2017 | Tauber | G06F 11/3668 |
| 2019/0312800 | A1* | 10/2019 | Schibler | H04L 41/082 |
| 2020/0097277 | A1* | 3/2020 | Gupta | H04L 41/082 |

OTHER PUBLICATIONS

Barrere et al., "A Tactical Active Information Sharing System for Military Manets", 2006, IEEE Military Communications conference (Year: 2006).*

Ylonen, "Multiplayer Networking With an Open Source Library", 2016, Turku University of Applied Sciences (Year: 2016).*

Anasane, "Open Source Software for Library", Jan. 2018, HVPM's College of Engineering and Technology (Year: 2018).*

Chow et al., "Semi-automatic Update of Applications in Response to Library Changes", 1996, IEEE (Year: 1996).*

* cited by examiner

SYSTEM AND METHOD FOR SAFE UPDATING OF OPEN SOURCE LIBRARIES

TECHNICAL FIELD

The present disclosure relates to open source in general, and to a system and apparatus for safe updating of open source libraries, in particular.

BACKGROUND

Open source relates to computer source code that is publicly available and may be freely accessed and used by programmers in developing code. Open source may be provided as binary files or libraries to be linked with a user's' project, as code files to be compiled with a user's project, as code snippets to be added and optionally edited by a user as part of a file, in any other format, or in any combination thereof.

Open source may be used for a multiplicity of reasons, such as but not limited to: saving programming and debugging time and effort by obtaining a functional and verified unit; porting or programming code to an environment in which the user has insufficient experience or knowledge; adding generic options such as graphic support, printing, or the like, or other purposes. The ease of obtaining open source on the Internet has greatly increased the popularity of its usage.

Despite the many advantages, source code may also carry hazards. One such danger may relate to updating the open source libraries used in a project. Developers or contributors often offer updates to open source libraries, for fixing bugs, adding functionality, adding support to various platforms, or the like. However, such updates, as any other open source unit, may comprise bugs or other undesired effects.

SUMMARY

One exemplary embodiment of the disclosed subject matter is a computer-implemented method comprising: obtaining user code; determining a collection of open source libraries used by the user code; for each open source library from the open source libraries: determining whether an updated version comprising an update area exists for the open source library, wherein the updated version is other than a version referenced by the user code; and subject to the existence of an updated version: subject to the updated area not being reachable from the user code, updating the open source library to the updated version; subject to the updated area being reachable only from a non-updated area of the updated version wherein the non-updated area is reachable from the user code, updating the open source library to the updated version; and subject to the updated area being reachable directly from a part of the user code, notifying a user about the updated version of the open source library and the part of the computer code. The method can further comprise updating the open source library to the updated version, subject to the updated area being reachable from the part of the user code. Within the method, updating the open source library to the updated version is optionally subject to user confirmation. Within the method, updating the open source library to the updated version is optionally subject to the area being reachable directly. Within the method, updating the open source library to the updated version is optionally subject to the area being reachable indirectly. Within the method, the updated area is optionally a class, a function, a method a procedure, or a version control system. Within the method, the open source library is optionally updated subject to: each updated area of the open source library being: unreachable from the user code, reachable only from a non-updated area of the updated version wherein the non-updated area is reachable from the user code, or reachable directly from a part of the user code and a user has approved the update.

Another exemplary embodiment of the disclosed subject matter is a computer-implemented method comprising: obtaining user code; and for an open source library used by the user code and for which an updated version comprising an updated area exists, wherein the updated version is other than a version referenced by the user code: subject to the updated area not being reachable from the user code, updating the open source library to the updated version; subject to the updated area being reachable only from a non-updated area of the updated version wherein the non-updated area is reachable from the user code, updating the open source library to the updated version; and subject to the updated area being reachable directly from a part of the user code, notifying a user about the updated version of the open source library and the part of the computer code. The method can further comprise updating the open source library to the updated version, subject to the updated area being reachable from the part of the user code. Within the method, updating the open source library to the updated version is optionally subject to user confirmation. Within the method, updating the open source library to the updated version is optionally subject to the area being reachable directly. Within the method, updating the open source library to the updated version is optionally subject to the area being reachable indirectly. Within the method, the updated area is optionally a class, a function, a method a procedure, or a version control system. Within the method, the open source library is optionally updated subject to: each updated area of the open source library being: unreachable from the user code, reachable only from a non-updated area of the updated version wherein the non-updated area is reachable from the user code, or reachable directly from a part of the user code and a user has approved the update.

Another exemplary embodiment of the disclosed subject matter is a computerized apparatus having a processor, the processor being adapted to perform the steps of: obtaining user code; determining a collection of open source libraries used by the user code; for each open source library from the open source libraries: determining whether an updated version comprising an update area exists for the open source library, wherein the updated version is other than a version referenced by the user code; and subject to the existence of an updated version: subject to the updated area not being reachable from the user code, updating the open source library to the updated version; subject to the updated area being reachable only from a non-updated area of the updated version wherein the non-updated area is reachable from the user code, updating the open source library to the updated version; and subject to the updated area being reachable directly from a part of the user code, notifying a user about the updated version of the open source library and the part of the computer code. Within the apparatus, the processor is optionally further configured to update the open source library to the updated version, subject to the updated area being reachable from the part of the user code. Within the apparatus, updating the open source library to the updated version is optionally subject to user confirmation. Within the apparatus, updating the open source library to the updated version is optionally subject to the area being reachable directly. Within the apparatus, updating the open source library to the updated version is optionally subject to the area being reachable indirectly.

Yet another exemplary embodiment of the disclosed subject matter is a computer program product comprising a computer readable storage medium retaining program instructions, which program instructions when read by a processor, cause the processor to perform a method comprising: obtaining user code; determining a collection of open source libraries used by the user code; for each open source library from the open source libraries: determining whether an updated version comprising an update area exists for the open source library, wherein the updated version is other than a version referenced by the user code; and subject to the existence of an updated version: subject to the updated area not being reachable from the user code, updating the open source library to the updated version; subject to the updated area being reachable only from a non-updated area of the updated version wherein the non-updated area is reachable from the user code, updating the open source library to the updated version; and subject to the updated area being reachable directly from a part of the user code, notifying a user about the updated version of the open source library and the part of the computer code.

BRIEF DESCRIPTION OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

In the specification below, unless otherwise noted, the term "update" should be widely construed to cover any version of an open source library that is more advanced than a currently installed version, and not necessarily the latest and most advanced version thereof.

One technical problem dealt with by the disclosed subject matter relates to updating open source libraries used in a programming project. Updates may be suggested to the libraries by their original developers or by other contributors for a number of purposes, such as but not limited to fixing bugs, fixing security vulnerabilities, adding functionality, porting to additional platforms, improving performance, or the like.

Some changes to open source libraries may have no effect on the user's code that uses them, as such changes are in code areas that are not reached from the user's program. However, other changes may have such effect. The effect may be desired and intentional, for example when the updated version contains a bug fix or performance improvement, but in some situations the effect may be unintentional, and may even cause harm such as introducing a bug, introducing a security issue, decreasing performance, or the like.

Thus, it is required to make such updates as smooth and automatic as possible, but in a careful manner so as to avoid undesired effects.

One technical solution comprises a method and system for updating open source libraries used by user code.

First, it may be determined whether there is an update to a used open source library. If there is, if the changed area of the library is not reached, directly or directly, from the user code, the library can be safely updated to the new version. The term "area" may relate to a file function, a method, or another unit that is being executed. In some embodiments, although the changed area is allegedly accessed but is not practically accessed, for example the user code access the file but not specific functions that have been changed within the file, or the user code access a function but not specific instructions that have been changed within the function. In some cases, it may depend on user definitions or preferences what granularity is to be used.

Then, if the changed area is accessed through an unchanged area of the library, and the user code accesses the unchanged area, the library can also be safely updated to the new version.

Only in cases where the user code accesses directly the changed area, the user may be notified about the accessing code, i.e., which part of the user code makes the access, and the accessed area, i.e., the part of the library that has been changed. The user can then make an educated choice, collect information about the change, evaluate the criticality of the accessing part, etc., and then decide whether to update the open source library or not.

One technical effect of the disclosure is that if the update does not pose any risk to the user code, the open source library is automatically updated, thus saving manual labor and confusion from the user on one hand, but avoiding risky situations on the other hand. Only in cases in which the changed areas of the library are accessed directly by the user code, the user may decide whether to approve the update or not.

Figure 1:
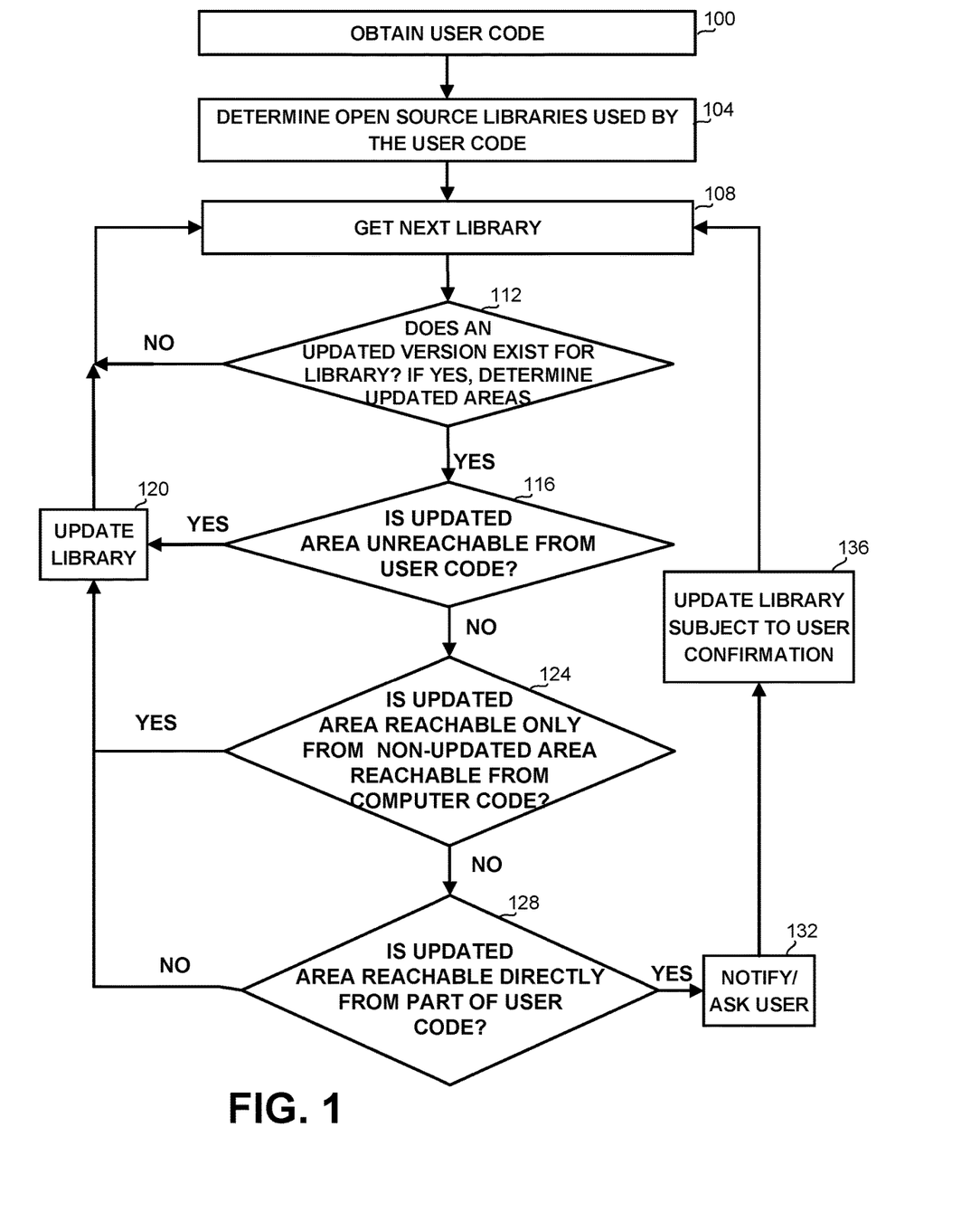
FIG. 1 is a flowchart of steps in a method for updating open source libraries used in a project, in accordance with some exemplary embodiments of the subject matter.

Referring now to FIG. 1, showing a flowchart of steps in a method for updating open source libraries used in a project, and to FIGS. 2A-2F illustrating an example of the method. A black rectangle in FIGS. 2A-2F indicate an area of an open source library which is changed in an updated version of the library.

On step 100, user code may be obtained. The method may be implemented by a stand-alone system, or as part of an Integrated Development Environment (IDE) implemented for example as a plug-in, as a web service, or the like. Thus, the code may be obtained from within the IDE, from a storage device, or the like.

On step 104, the open source libraries used by the user code may be determined. The libraries may be iterated on step 308.

On step 112, it may be determined whether the currently handled library has an update. If no, execution goes back to step 108 for the next library.

Figure 2A:
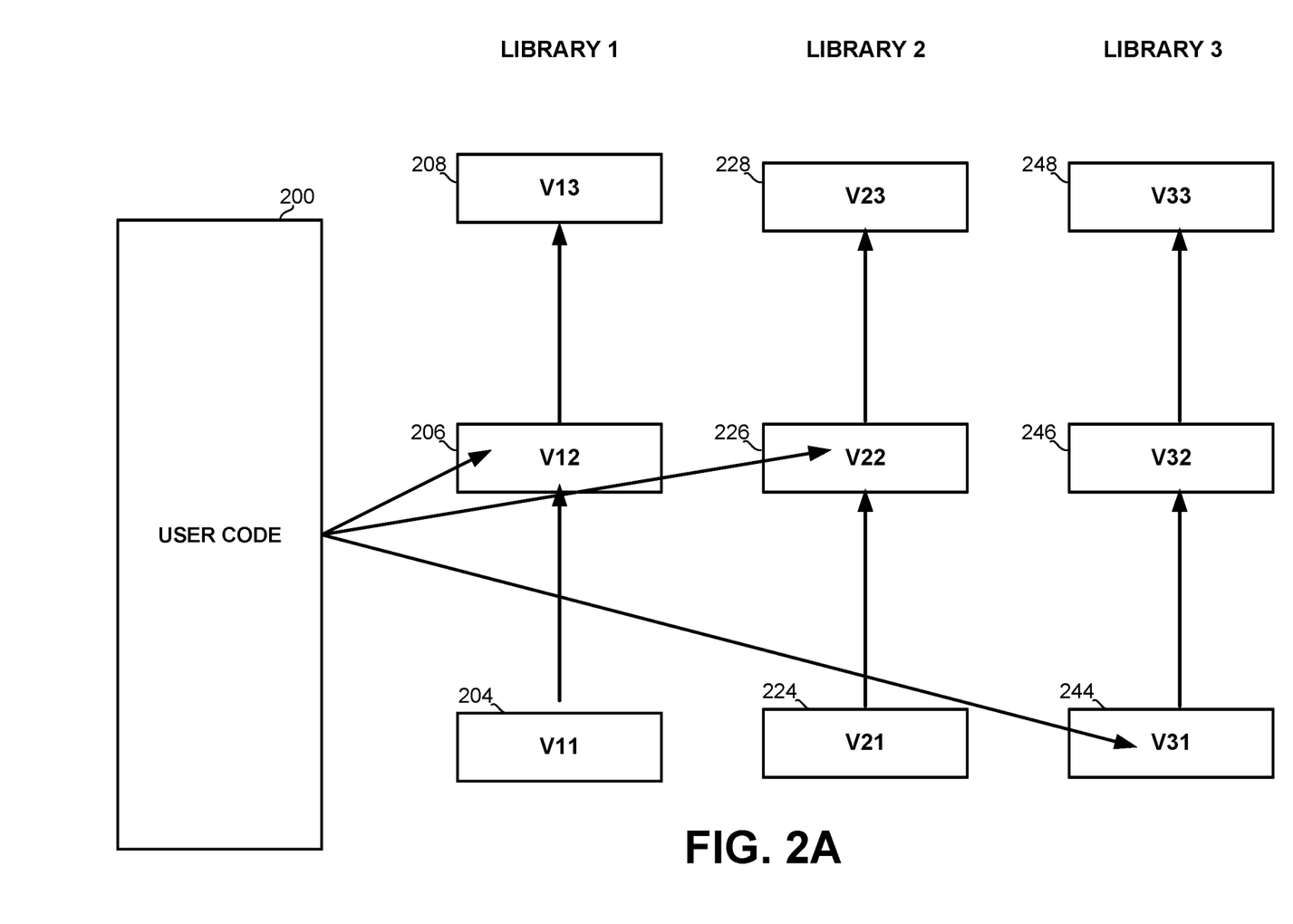
FIGS. 2A-2G illustrate an example of the steps in the method of FIG. 1, in accordance with some exemplary embodiments of the subject matter.

Referring now to FIG. 2A, showing user code 200, using Library 1, Library 2 and Library 3, each having three versions, for example V11 204 of Library 1 is updated by V12 206 of Library 1 containing an area 256 which is an update of area 250, which in turn is updated by V13 208 of Library 1, containing an area 268 which is an update of area 256, and similarly for Library 2 and Library 3. User code 200 uses V12 206 of Library 1 for which an update V13 208 exists, and V22 of Library 2 for which an update V23 228 exists containing area 272 which is an update of area 260, which in itself is an update of area 252. User code 200 also uses V31 244 of Library 3 comprising area 254, for which two updated exist, V32 246 in which area 264 is an update of area 254 and V33 248 in which area 276 is an update of area 264. The black rectangles in FIGS. 2A-2F indicate areas for which an updated version comprises a change.

On step 112, if there is an update, one or more areas that have been updated in the open source library may be identified. The areas may be determined in any manner, such as but not limited to: parsing and analyzing documentation of the library, analyzing structured input provided with the library, comparing source files and then if changes have been detected between files, comparing entities such as classes, functions, methods, Git or another version control system, or others. An updated area may refer to newly added entities such as classes, functions, methods, any code or file change, or the like, which are not and cannot be accessed by the user code. Further updated areas may include changes to pre-exiting entities.

Figure 2B:
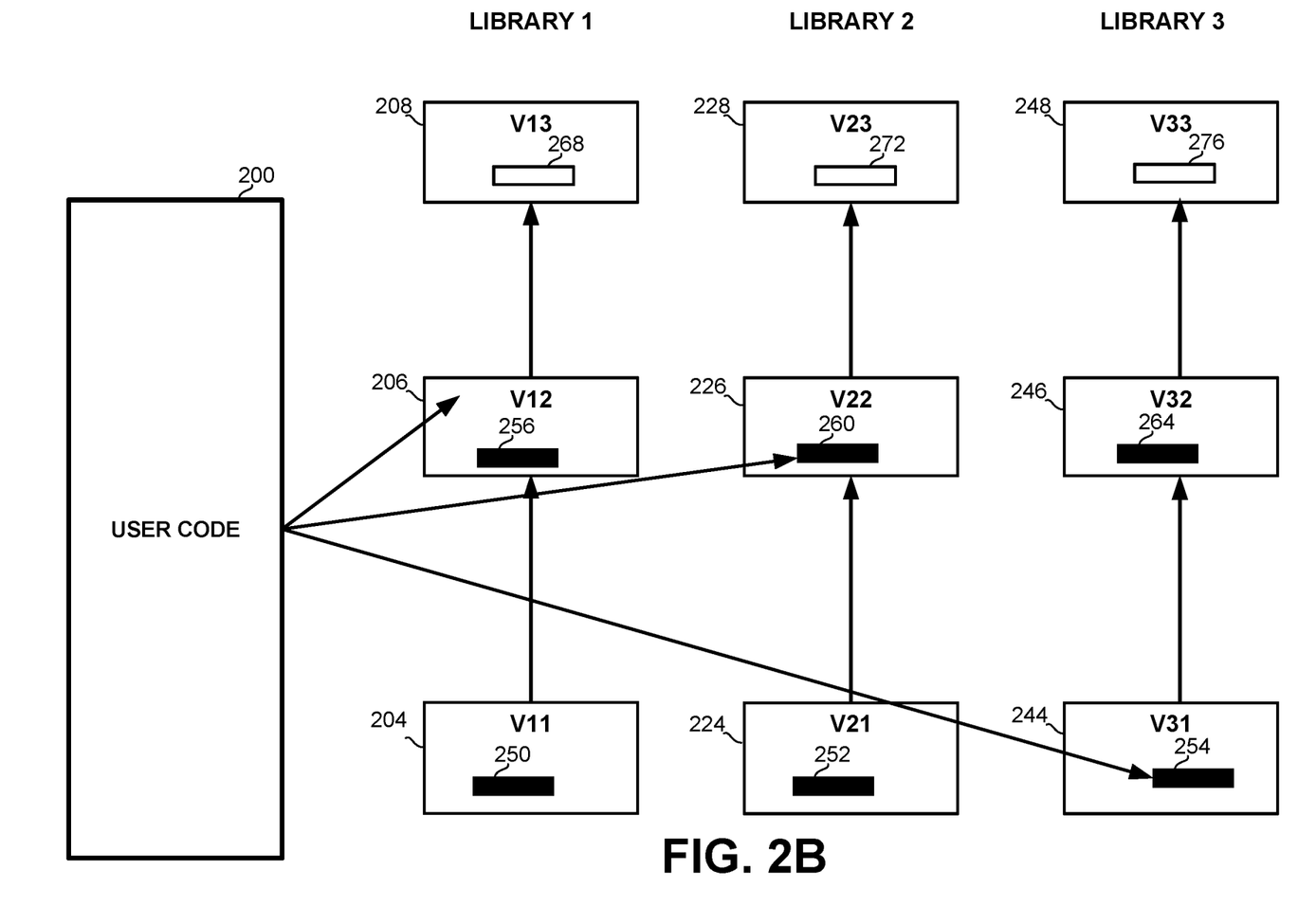
Figure 2C:
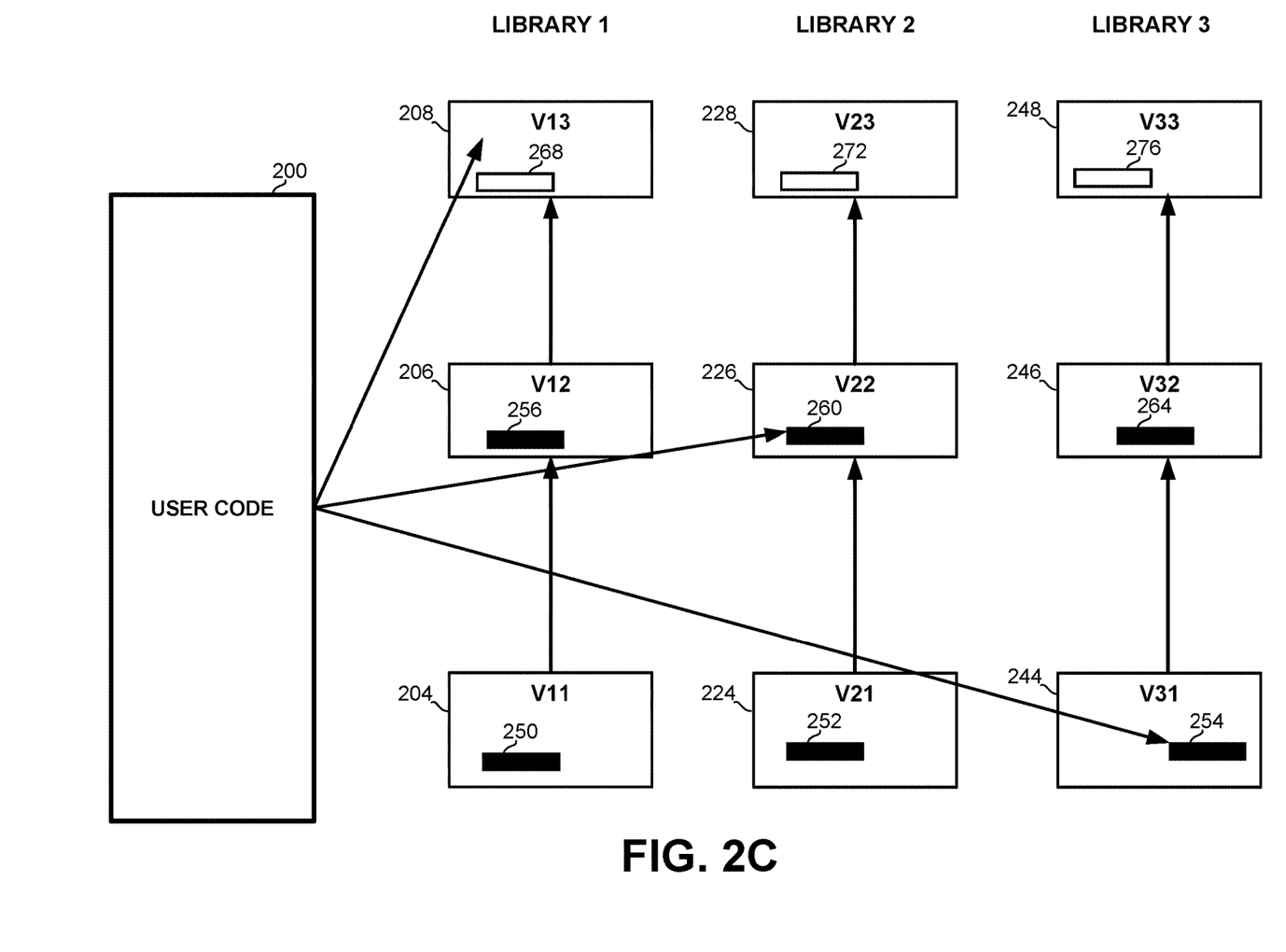

On step 116, it may be determined whether the updated area is unreachable, directly or indirectly, from the user code. Referring now to FIG. 2B, showing that area 256 of version V12 206 of Library 1 is indeed unreachable from user code 200.

If the updated area is indeed unreachable, then on step 120 the library may be updated automatically. Thus, as shown on FIG. 2C, Library 1 may be updated to version V13 208, in which area 268 is an update of area 256.

Figure 2D:
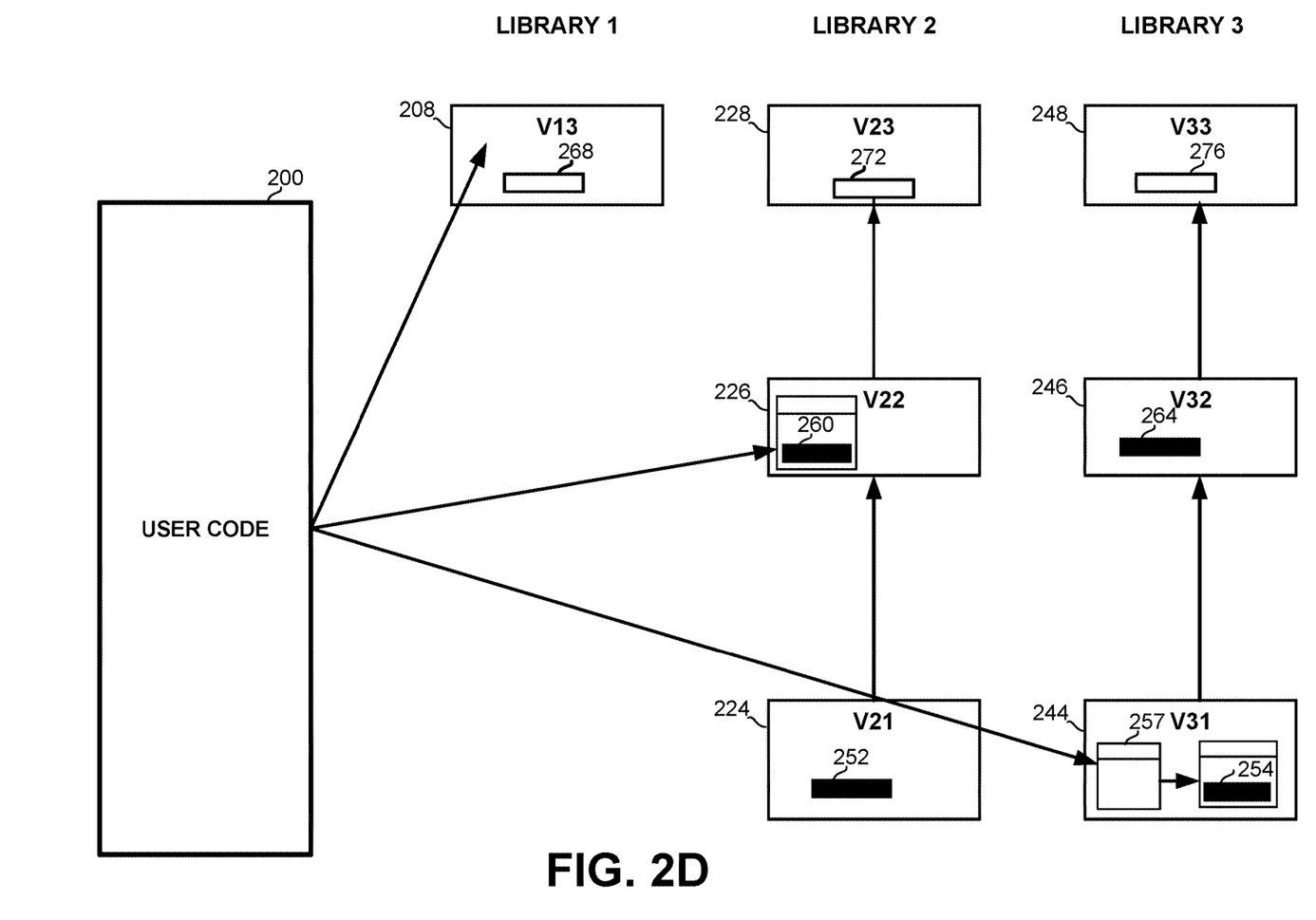

On step 124, it may be determined whether the updated area is reachable only from non-updated area of the library, which is reachable from the user code, i.e., whether the updated area is reachable only in an indirect manner. FIG. 2D shows that user code 200 indeed accesses changed area 254 of Library 1, but only indirectly through area 257.

If the updated area is indeed reachable only from non-updated area of the library, then execution can go to step 120, and the library may be automatically updated. However, in some embodiments, a user may be notified/asked about the update and the update may be subject to the user's confirmation.

Figure 2E:
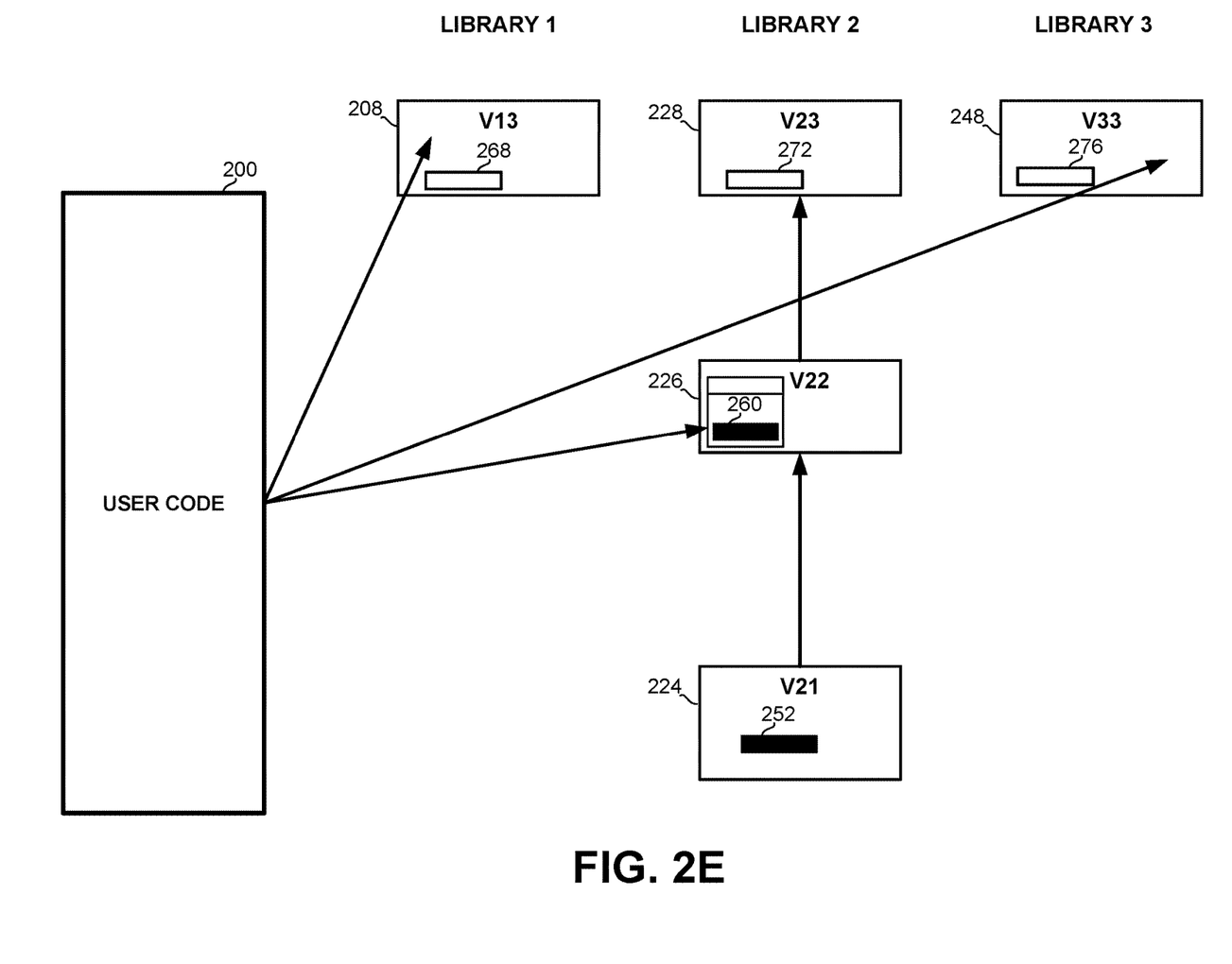

Referring now to FIG. 2E, showing that in such case, Library 3 may indeed be updated to the latest available version, being V33 248.

On step 128, it may be determined whether the updated area is reachable directly from the user code, and particularly from which part thereof. In some situations, this check may be omitted, since the relationships between code entities may be unreachable, reachable directly, and reachable indirectly. If the updated area is not unreachable and not reachable indirectly, then it is reachable directly. If the updated area is reachable directly from the user code, then on step 132 a user may be notified that an update for the library exists. The user may be further notified of the updated area of the library, and the part of the user code that accesses it. If the code is reachable indirectly, the library may be updated on step 120. In some embodiments, even if the code is reachable indirectly, the user may be notified or asked whether to update the library.

It will be appreciated that a trace of the updated libraries may be created and provided to the user. In some embodiments, for each such library, its calling trace may be displayed.

Figure 2F:
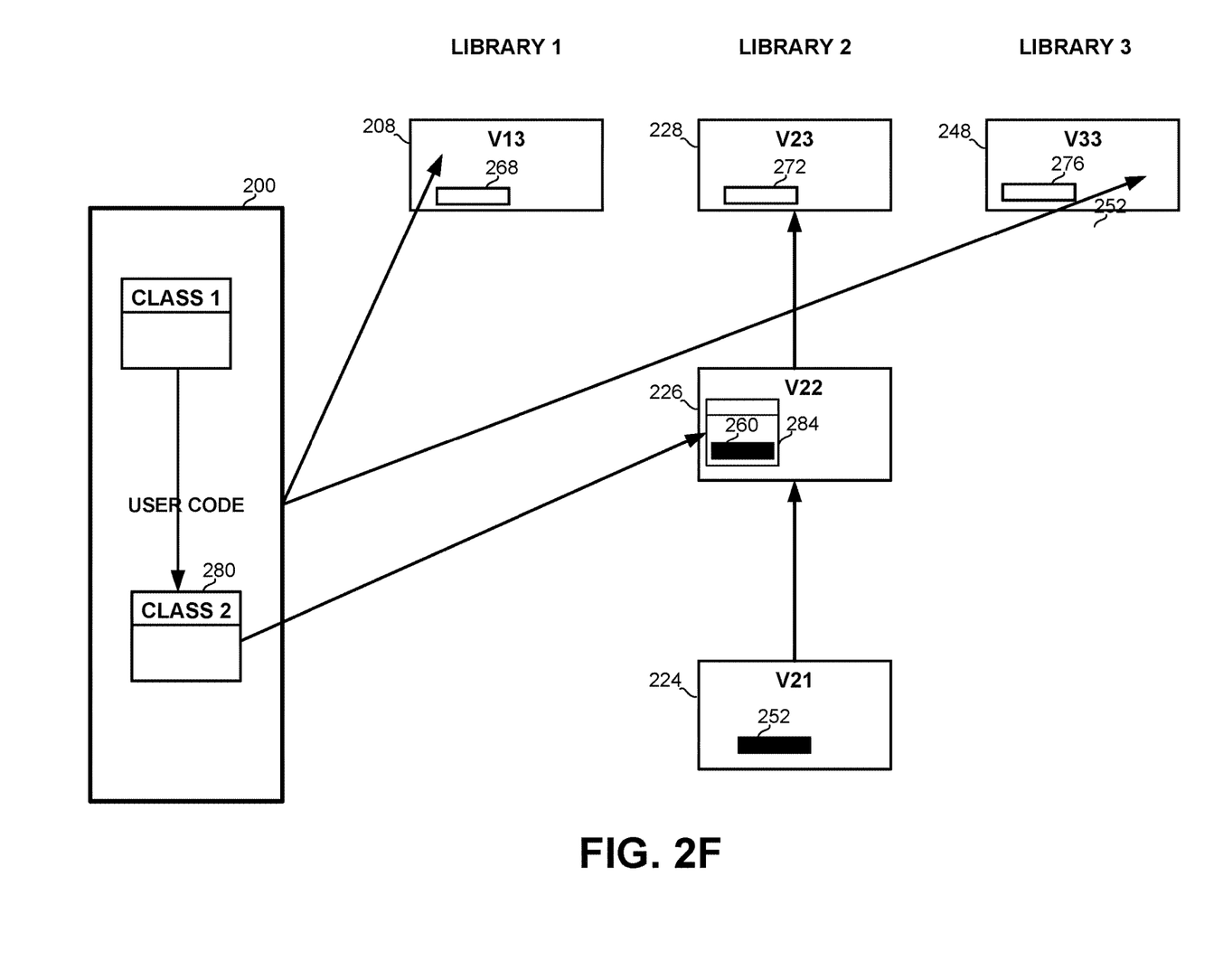

For example, FIG. 2F shows that Class 2 280 of user code 200 accesses area 260 for which an update exists. Area 260 may be accessed as part of another area, for example area 284, which may be a file containing area 260. The user may then be notified that Class 2 280 access area 260.

Figure 2G:
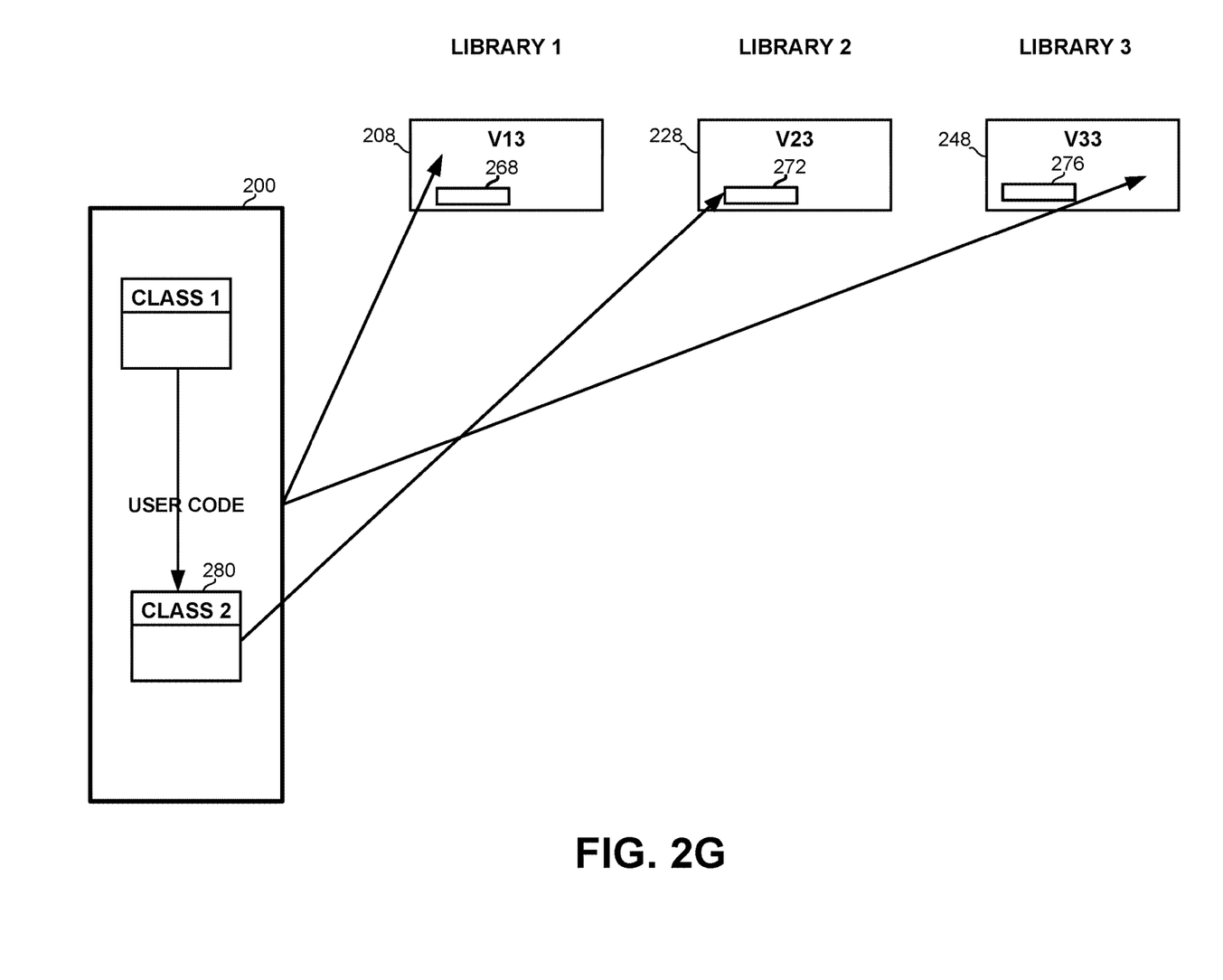

The library may then be updated, subject to user confirmation. Thus, as shown on FIG. 2G, Library 2 is also updated to version V23 228, updating area 260 to area 272.

The reachability analysis may be performed in a multiplicity of ways, for example as disclosed in U.S. patent application Ser. No. 15/973,702, filed May 8, 2018 titled "A System and Method for Identifying Vulnerabilities in Code Due to Open Source Usage", and in U.S. patent application Ser. No. 16/702,834, filed Dec. 4, 2019 and titled "A System and Method for Interprocedural Analysis".

In some embodiments, if a library has an update in which multiple areas have been changed, only if all areas are unreachable or reachable only indirectly from the user code, the library may be updated automatically. If there is at least one area accessed directly from the user code, updating may be subject to user confirmation.

It will be appreciated that the method may be initiated upon a notification that an update Is available for one or more open source libraries used in the user code. In such scenario, steps 104 or 108 may be omitted, and step 112 may be reduced to determining the updated areas.

Figure 3:
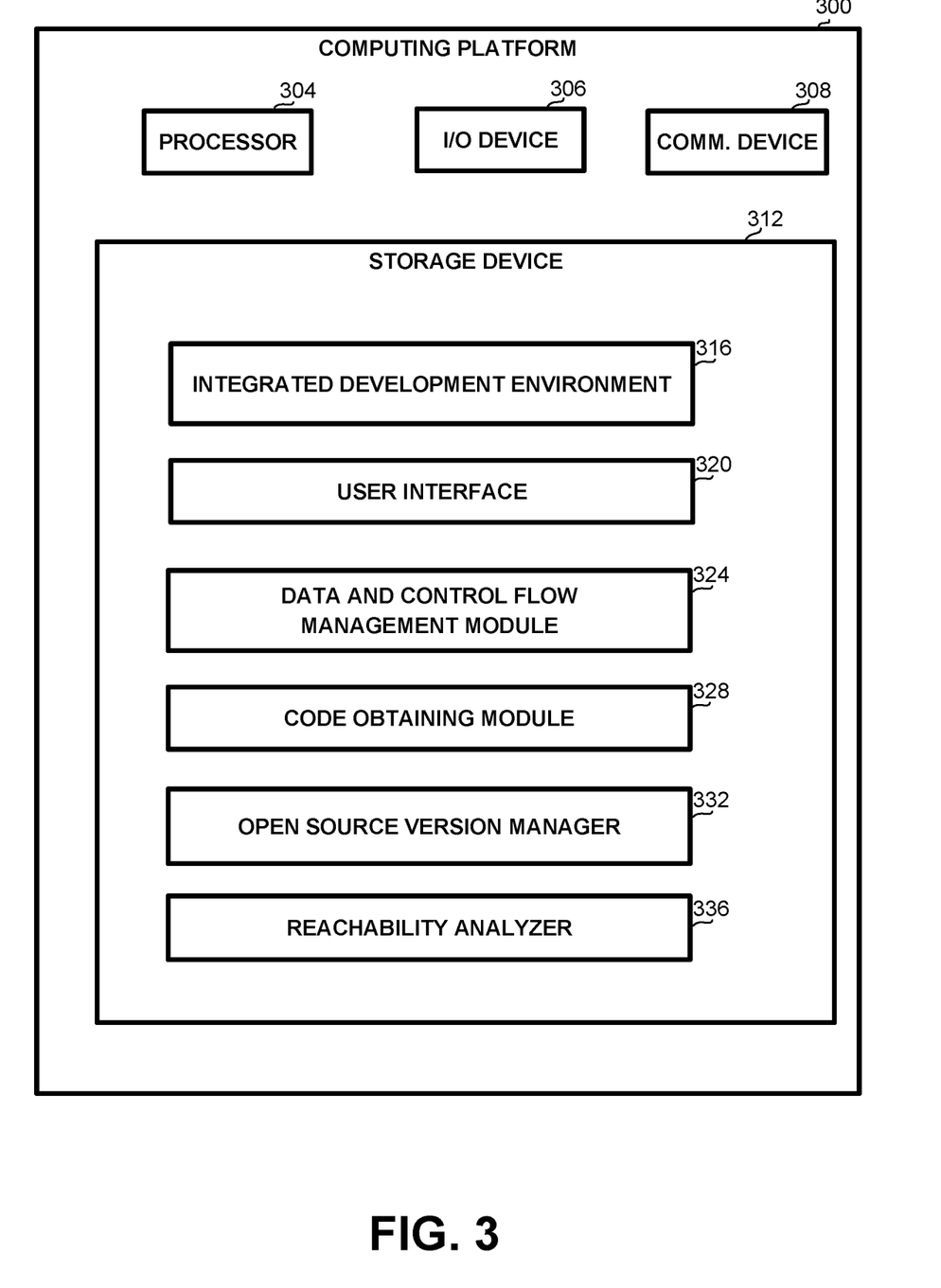
FIG. 3 shows a block diagram of a system for updating open source libraries used in a project, in accordance with some exemplary embodiments of the subject matter.

Referring now to FIG. 3 showing a block diagram of a system for updating an open source library used in a project, in accordance with some exemplary embodiments of the subject matter.

The system may comprise one or more computing platform 300, which may be for example a computing platform used by a developer. The system may be implemented as a stand-alone system, or as part of an Integrated Development Environment (IDE) implemented for example as a plug-in, as a web service providing services to one or more clients, or the like.

In some exemplary embodiments of the disclosed subject matter, computing platform 300 can comprise processor 304. Processor 304 may be any one or more processors such as a Central Processing Unit (CPU), a microprocessor, an electronic circuit, an Integrated Circuit (IC) or the like. Processor 304 may be utilized to perform computations required by the apparatus or any of it subcomponents.

In some exemplary embodiments of the disclosed subject matter, computing platform 300 can comprise an Input/Output (I/O) device 306 such as a display, a pointing device, a keyboard, a touch screen, or the like. I/O device 306 can be utilized to receive input from a user, such as confirmation to library update, and to provide output to a user, such as the code part of the user code that may be affected, and the area of the library that is changed by the newly available version.

In some exemplary embodiments of the disclosed subject matter, computing platform 300 can comprise a communication device 308, for obtaining information about library updates, retrieving library updates, or the like.

Computing platform 300 may comprise a storage device 312. Storage device 312 may be a hard disk drive, a Flash disk, a Random Access Memory (RAM), a memory chip, or the like. In some exemplary embodiments, storage device 312 can retain program code operative to cause processor 304 to perform acts associated with any of the subcomponents of computing platform 300.

Storage device 312 can store the modules detailed below. The modules may be arranged as one or more executable files, dynamic libraries, static libraries, methods, functions, services, or the like, programmed in any programming language and under any computing environment.

Storage device 312 may store an integrated development environment 316, also referred to as IDE, designed for programming, compiling if required, executing and debugging program code. One or more of the modules below may be implemented as one or more components such as plug-ins for IDE 316, enabling automatic or user-confirmed update of one or more open source libraries.

Storage device 312 may store user interface 320 for displaying to a user or receiving from the user various aspects associated with the disclosure, such as displaying a request for confirmation of an update, including the updated open source and effected part of the user code, receiving from a user's granularity settings, or the like.

Storage device 312 can store data and control flow management module 324, for managing the control and data flow of the apparatus, such that modules are invoked at the correct order and with the required information. For example, data and control flow management module 324 can be configured to ask for user confirmation for an update, subject to determining the existence of direct access from user code to a changed area of an open source library.

Storage device 312 can store code obtaining module 328 for obtaining computer code from a user. The code may be received in any manner, such as read from one or more files, retrieved through a communication channel, or the like. Code obtaining module 328 can also be part of IDE 316 which provides access to the code.

Storage device 312 can store open source version manager 332 for obtaining information about open source libraries used by the user code, available updates, which areas, such as files, functions, classes or the like are affected by the update, retrieving of the update if automatic update of confirmed update is available, or the like. Open source version manager 332 may also comprise a component for determining the changes introduced by the update, for example parsing documentation and file comparison, or the like.

Open source version manager 332 may also be responsible for updating the open source code library if required and/or confirmed.

Storage device 312 can store reachability analyzer 336 for analyzing the user code or the used open source libraries, and determining whether an updated area of an open source library is accessible from the user code, and if accessible whether it is accessible directly or indirectly. It will be appreciated that reachability analyzer 336 may operate in one or more iterations of increasing resolution. For example, first determining whether a change is introduced to a non-included file, or a non-used class, and only after it is verified that the change is in an included or used file or class, further determining whether the change is in an accessed function or method.

The disclosed method and apparatus thus provide for fine resolution of vulnerability in an efficient manner, since it is not attempted to obtain fine resolution information for paths that include only components which are not known to be vulnerable. Rather at each stage further refinement is performed only for those paths that do contain vulnerabilities, thus providing for locating those vulnerabilities that can actually be reached from the user's code.

It is noted that the teachings of the presently disclosed subject matter are not bound by the computing platforms described with reference to FIG. 2 and the method of FIG. 3. Equivalent and/or modified functionality can be consolidated or divided in another manner and can be implemented in any appropriate combination of software with firmware and/or hardware and executed on one or more suitable devices. The steps of FIG. 3 or FIG. 4 can also be divided or consolidated in a different manner.

The system can be a standalone entity, or integrated, fully or partly, with other entities, which can be directly connected thereto or via a network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, JavaScript, NodeJs, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   obtaining user code;
   determining a collection of open source libraries used by the user code;
   for at least one open source library from the open source libraries:
   determining whether an updated version comprising an update area exists for the open source library, wherein the updated version is other than a version referenced by the user code; and
   in response to the existence of an updated version:
   in response to the updated area not being reachable from the user code, updating the open source library to the updated version;
   in response to the updated area being reachable only from a non-updated area of the updated version wherein the non-updated area is reachable from the user code, updating the open source library to the updated version; and
   in response to the updated area being reachable directly from a part of the user code, notifying a user about the updated version of the open source library and the part of the computer code.

2. The method of claim 1, further comprising updating the open source library to the updated version, in response to the updated area being reachable from the part of the user code.

3. The method of claim 2, wherein updating the open source library to the updated version is in response to user confirmation.

4. The method of claim 2, wherein updating the open source library to the updated version is in response to the area being reachable directly.

5. The method of claim 2, wherein updating the open source library to the updated version is in response to the area being reachable indirectly.

6. The method of claim 1, wherein the updated area is a class, a function, a method a procedure, or a version control system.

7. The method of claim 1, wherein the open source library is updated in response to: each updated area of the open source library being: unreachable from the user code, reachable only from a non-updated area of the updated version wherein the non-updated area is reachable from the user code, or reachable directly from a part of the user code and a user has approved the update.

8. A computerized apparatus having a processor, the processor being configured to perform the steps of:
   obtaining user code;
   determining a collection of open source libraries used by the user code;
   for at least one open source library from the open source libraries:
      determining whether an updated version comprising an update area exists for the open source library, wherein the updated version is other than a version referenced by the user code; and
      in response to the existence of an updated version:
         in response to the updated area not being reachable from the user code, updating the open source library to the updated version;
         in response to the updated area being reachable only from a non-updated area of the updated version wherein the non-updated area is reachable from the user code, updating the open source library to the updated version; and
         in response to the updated area being reachable directly from a part of the user code, notifying a user about the updated version of the open source library and the part of the computer code.

9. The apparatus of claim 8, wherein the processor is further configured to update the open source library to the updated version, in response to the updated area being reachable from the part of the user code.

10. The apparatus of claim 9, wherein updating the open source library to the updated version is in response to user confirmation.

11. The apparatus of claim 9, wherein updating the open source library to the updated version is in response to the area being reachable directly.

12. The apparatus of claim 9, wherein updating the open source library to the updated version is in response to the area being reachable indirectly.

13. A computer program product comprising a computer readable storage medium retaining program instructions, which program instructions when read by a processor, cause the processor to perform a method comprising:
   obtaining user code;
   determining a collection of open source libraries used by the user code;
   for at least one open source library from the open source libraries:
      determining whether an updated version comprising an update area exists for the open source library, wherein the updated version is other than a version referenced by the user code; and
   in response to the existence of an updated version:
      in response to the updated area not being reachable from the user code, updating the open source library to the updated version;
      in response to the updated area being reachable only from a non-updated area of the updated version wherein the non-updated area is reachable from the user code, updating the open source library to the updated version; and
      in response to the updated area being reachable directly from a part of the user code, notifying a user about the updated version of the open source library and the part of the computer code.

\* \* \* \* \*